United States Patent Office 3,799,981
Patented Mar. 26, 1974

3,799,981
PROCESS FOR THE PREPARATION OF
NITRILOTRIACETAMIDES
Donald H. Thorpe, Williamsville, and George C. Hopkins, Clarence, N.Y., assignors to Hooker Chemical Corporation, Niagara Falls, N.Y.
No Drawing. Continuation-in-part of application Ser. No. 741,201, June 28, 1968. This application Dec. 31, 1970, Ser. No. 103,277
Int. Cl. C07c *103/30*
U.S. Cl. 260—561 A        20 Claims

ABSTRACT OF THE DISCLOSURE

There is provided a process for producing nitrilotriacetamides which comprises forming a polyhydroxy ester of ingredients comprising nitrilotriacetic acid and a glycol, and thereafter reacting said polyhydroxy ester with a compound selected from the group consisting of ammonia, primary amines, dimethylamine and mixtures thereof, wherein said compound has a dissociation constant ($K_b$) of less than $1 \times 10^{-7}$. The nitrilotriacetamides are useful as epoxy curing agents and in forming methylol compounds which are used in permanent press fabrics, molding compounds and the like.

CROSS REFERENCES TO RELATED APPLICATIONS

This is a continuation-in-part of copending application Ser. No. 741,201, filed June 28, 1968, now abandoned.

BACKGROUND OF THE INVENTION

It is well known to prepare amides of acids by ammonolysis of esters with ammonia, primary and secondary amines. This reaction, however, is frequently slow and unless the reaction is allowed to proceed for long periods of time in the presence of water, the yields are low. It has also been known that the addition of ethylene glycol, diethylene glycol or glycerol to the ester, and employing anhydrous ammonia will greatly accelerate formation of the amides. See Gordon et al., J. Am. Chem. Soc., 70, 1953 (1948) and J. Am. Chem. Soc., 71, 1245–1250 (1949). This still requires preparation of the esters, purification thereof, and reaction with ammonia in the presence of the glycol. When it is desired to reuse the alcohol and the glycol, it is first necessary to separate the mixture thereof. These processes would be even less desirable when applied to nitrilotriacetic acid because the acid has a low solubility in the lower alcohols thereby making it difficult to prepare esters of the lower alcohols and because ammonolysis of the nitrilotriacetic acid esters of the higher alcohols is very slow.

It is the object of this invention to provide a process for producing nitrilotriacetamides. It is also the object of this invention to provide a process for producing these compounds in a relatively short period of time. A further object is to provide an economical process for the production of nitrilotriacetamides. Other objects will become apparent to those skilled in the art from the following detailed description.

SUMMARY OF THE INVENTION

This invention relates to a process for producing nitrilotriacetamides. More particularly this invention relates to a process for producing nitrilotriacetamides which comprises forming a polyhydroxy ester of ingredients comprising nitrilotriacetic acid and a glycol, and thereafter reacting said polyhydroxy ester with a compound selected from the group consisting of ammonia, primary amines, dimethylamine and mixtures thereof, wherein said compound has a dissociation constant ($K_b$) of less than $1 \times 10^{-7}$. In a preferred embodiment, excess glycol is employed and the preferred glycol is ethylene glycol.

DESCRIPTION OF THE PREFERRED EMBODIMENTS

In accordance with the invention, there is provided a process for producing nitrilotriacetamides of the formula:

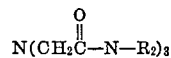

wherein each R is individually selected from the group consisting of hydrogen, alkyl, alkenyl, arylalkyl, cycloalkyl, aminoalkyl and hydroxyalkyl. Typical R groups are hydrogen, ethyl, allyl, butyl, octyl, decyl, dodecyl, tetradecyl, stearyl, octadecyl, behenic, n-tetracosanic, cyclopentyl, cyclohexyl, cyclohexylmethyl, butylcyclohexyl, 13-cyclopentenyl-n-tridecanoic, tolyl, xylyl, benzyl, phenylethyl, phenylbutyl, aminoethyl, aminopropyl, aminobutyl, hydroxyethyl, hydroxypropyl, and various isomers and analogs thereof. The six R groups in any given compound may be the same or different. Representative compounds within the formula are nitrilotriacetamide, nitrilo tris (N-methylacetamide), nitrilo tris (N-benzylacetamide), nitrilo tris (N-cyclohexylmethylacetamide), nitrilo tris (N-decylacetamide), nitrilo tris (N-stearylacetamide) and

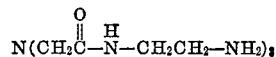

The nitrilotriacetamides of this invention are useful as epoxy curing agents as described in copending application Ser. No. 740,855, filed June 28, 1968, now U.S. Pat. 3,538,050. They can also be reacted with formaldehyde to form methylol compounds. See, e.g., U.S. Pat. 3,326,-974. The methylol derivatives are useful for imparting permanent press properties to cotton cloth and for preparing thermoset molding compounds using cellulose as a filler.

In the first step of the preferred process of this invention, a polyhydroxy ester is formed of ingredients comprising nitrilotriacetic acid and a glycol. Typical glycols include butene diol; butyne diol; ethylene glycol; diethylene glycol; triethylene glycol; tetraethylene glycol; propylene glycol; dipropylene glycol; polypropylene glycol; hexylene glycol; 2-methyl-2-ethyl-1,3-propanediol; 2-ethyl-1,3-hexanediol; 1,5-pentanediol; thiodiglycol; 1,3-propanediol; 1,3-butanediol; 2,3-butanediol; 1,4-butanediol; 1,3-butylene glycol; neopentyl glycol; 1,2-dimethyl-1,2-cyclopentanediol; 1,2-cyclohexanediol; 1,2-dimethyl-1,2-cyclohexanediol; like compounds apparent to those skilled in the art; and mixtures thereof. The lower symmetrical glycols have 2 to 10 carbon atoms are preferred, and the most preferred glycol is ethylene glycol. While the number of moles of nitrilotriacetic acid to the number of moles of glycol in the esterification reaction can be in a ratio of 1:3, it is preferred to employ an excess of glycol, i.e., a ratio of at least 1:4.

A typical esterification procedure comprises: a reaction vessel is fitted with a stirrer, nitrogen inlet tube, thermometer, water cooled condenser, cooled receiver connected to the condenser, and heating means. The nitrilotriacetic acid and glycol are charged into the vessel and heated under agitation and an inert nitrogen sparge until esterification is complete, usually measured by the acid number technique or by other conventional means. The vessel is then cooled and the product recovered. The temperature can range from about 125 to about 275 degrees centigrade, although temperatures of about 160 to about 230 degrees centigrade are preferred. The time necessary to complete the above-described esterification reaction can vary from 1 to 36 hours, although times of about 3 to about 30 hours are preferred and times of about 4 to about 20 hours are most preferred. Additionally, a conventional esterification catalyst, such as phosphoric acid, p-toluene-sulfonic acid, methanesulfonic acid, hexanesulfonic acid, benzenesulfonic acid, 4-chlorobenzenesulfonic acid, chlorosulfonic acid, 2-naphthalenemethanesulfonic acid, 1,6-naphthalenesulfonic acid, borontrifluoride, lead oxide, antimony oxide, stannic chloride, silver oxide, and the like can be employed.

The polyhydroxy ester is thereafter reacted with a compound selected from the group consisting of ammonia, primary amines and mixtures thereof, wherein said compound has a dissociation constant ($K_b$) of less than $1 \times 10^{-7}$. The compound can have the formula $NH_2R_2$ wherein $R_2$ is selected from the group consisting of hydrogen, alkyl of 1 to 25 carbon atoms, alkenyl of 2 to 8 carbon atoms, arylalkyl of 7 to 10 carbon atoms, cycloalkyl of 5 to 13 carbon atoms, aminoalkyl of 1 to 4 carbon atoms, and hydroxyalkyl of 1 to 3 carbon atoms. Typical $R_2$ groups are hydrogen, ethyl, allyl, butyl, octyl, decyl, dodecyl, tetradecyl, stearyl, octadecyl, behenic, n-tetracosanic, n-pentacosanic, hexenyl, octenyl, cyclopentyl, cyclohexyl, cyclohexylmethyl, butylcyclohexyl, 13-cyclopentenyl-n-tridecanoic, tolyl, xylyl, benzyl, phenylethyl, phenylbutyl, aminoethyl, aminopropyl, aminobutyl, hydroxyethyl, hydroxypropyl, and the like. Each $R_2$ group preferably contains 1 to 25 carbon atoms. The excess glycol, and any polyester present, need not be removed before ammonolysis of the polyhydroxy product. The ammonolysis is effected by conventional methods at from ambient temperatures to about 130 degrees centigrade; the reaction temperature being chosen to insure that the glycol ester is fluid at the temperature selected. For example, ammonia can be bubbled through the polyhydroxy ester or an amine can be added to the polyhydroxy ester. The glycol is removed by conventional methods including filtration and vacuum distillation.

The following examples are presented to illustrate the invention, but are not intended to limit it. All parts and percentages are by weight and temperatures in degrees centigrade unless otherwise specified.

EXAMPLE 1—Comparative example

A 5 liter batch of the tris-2-ethylhexyl ester of nitrilotriacetic acid was made from 955 grams of nitrilotriacetic acid and 2150 grams of 2-ethylhexanol using 0.1 percent p-toluene sulfonic acid as a catalyst for the esterification. It required 26 hours to obtain an acid number of 0.4. Thereafter, the catalyst was neutralized with potassium carbonate and the ester was distilled under vacuum. A charge of 26.4 grams of the ester was placed in a 100 milliliter flask and 2.55 grams of anhydrous ammonia was bubbled in. After standing for 4 days at room temperature, crystalline nitrilotriacetamide was recovered in an 85 percent yield.

EXAMPLE 2—Comparative example

A mixture of 2677 grams nitrilotriacetic acid, 6050 grams 2-ethylhexanol and 8.6 grams p-toluene sulfonic acid was heated at 220 degrees centigrade removing water until an acid number of zero was obtained. The reaction mixture was cooled to 25 degrees centigrade and the catalyst neutralized with potassium carbonate. Thereafter, 2800 grams ethylene glycol and 6483 grams 2-ethylhexanol were added followed by the addition of 785 grams anhydrous ammonia with cooling to hold the temperature at 25–30 degrees centigrade. After standing for 4 days, crystals began to form. After a total of 6 days, the crystals were filtered off and washed with ethanol. Nitrilotriacetamide was recovered in an 85.6 percent yield.

EXAMPLE 3—Inventive process

A charge of 3504 grams ethylene glycol and 1518 grams nitrilotriacetic acid were placed in a 5 liter flask. A nitrogen sparge was employed and esterification carried out at 200–250 degrees centigrade. After 5 hours, the esterification was complete as indicated by an acid number of less than one. The flask was cooled to 86 degrees centigrade and ammonia gas bubbled in while the flask continued cooling. When the addition of ammonia was completed after 2 hours, the temperature was 38 degrees centigrade and the nitrilotriacetamide had crystalled out. The mixture was cooled to 25 degrees centigrade and filtered on a vacuum filter. The product was washed with methanol and dried at 65–70 degrees centigrade. There was recovered 1340 grams of nitrilotriacetamide, which represents a yield of 89.8 percent. Percent N calculated 29.74; found 29.89.

Employing the process of the invention, nitrilotriacetamide can be prepared in good yield in about 2 to 4 hours while 4 to 6 days were required to prepare the compound by the processes of Examples 1 and 2. The following examples further illustrate the inventive process.

EXAMPLE 4

The glycol ester of nitrilotriacetic acid was prepared as described in Example 3. This was separated into smaller batches for reaction with various amines. A charge of 735 grams of the crude glycol ester was placed in a flask and 145 grams of monomethylamine was added, and the flask was maintained at 25 degrees centigrade. Thereafter, the glycol was removed by vacuum distillation at a temperature of 125 degrees centigrade and a pressure of 25 millimeters of mercury. The residue was cooled, acetone was added to crystallize the nitrilo tris (N-methylacetamide), the crystals were filtered off and dried. 270 grams of the product was recovered, which represents a yield of 89.5 percent. Percent N calculated 24.30; found 24.33.

EXAMPLE 5

Following the procedure of Example 4, but substituting monobenzylamine, nitrilo tris (N-benzylacetamide) was prepared in a 96.5 percent yield.

EXAMPLE 6

Following the procedure of Example 4, but substituting dimethylamine, nitrilo tris (N-dimethylacetamide) was obtained in a 98 percent yield.

EXAMPLE 7

Following the procedure of Example 4 but substituting 2-aminoethanol, nitrilo tris (N-hydroxyethylacetamide) was prepared in a 98 percent yield.

EXAMPLE 8

Following the procedure of Example 4 but substituting ethylenediamine,

can be prepared.

EXAMPLE 9

Nitrilo tris (N-stearylacetamide), which is useful as a polyvinyl chloride lubricant was prepared by heating 567 grams of nitrilo tris (2-ethylhexyl acetate), 131 grams of ethylene glycol, 500 grams of 2-ethylhexanol and 980 grams of stearyl amine at 112 degrees centigrade until titration indicated that the reaction was complete. This took 22 hours. The product was recrystallized from isopropyl alcohol. The yield was 71 percent and the product had a melting point of 110–112 degrees centigrade.

EXAMPLE 10

The nitrilo tris (N-stearylacetamide) was also prepared by the inventive process by heating a charge of 1433 grams of a crude ethylene glycol triester of nitrilotriacetic acid at 75–80 degrees centigrade and adding 2135 grams of stearyl amine over a period of 50 minutes. The temperature was raised to 112 degrees centigrade until titration indicated the reaction was complete. This took 3.5 hours. The product was recrystallized from isopropyl alcohol. The yield was 90.5 percent and the product had a melting point of 109–110.5 degrees centigrade.

Various modifications can be made in the invention without departing from the spirit and the scope thereof. The various embodiments of the invention disclosed herein serve to further illustrate the invention, but are not intended to limit it.

EXAMPLE 11

The neopentyl glycol ester of nitrilotriacetic acid was prepared by combining one mole (191 grams) nitrilotriacetic acid with 6 moles (564 grams) of neopentyl glycol according to the following procedure:

The neopentyl glycol was charged into a one-liter flask equipped with a stirrer, a 1" x 6" Vigreaux column and nitrogen inlet. A heated oil bath was used to melt the glycol. Nitrilotriacetic acid was added to the molten glycol and the mixture was heated to about 200° C., removing the water formed through the column until an acid number of 1.7 was obtained. The ester obtained is a resinous solid at room temperature which when heated to 60° C. could be easily stirred.

The triamide was prepared from the above-prepared ester by combining the ester with ammonia in the following proportions:

Ester of neopentyl glycol and nitrilotriacetic acid 275.8 grams (0.44 mole).

Ammonia 25.5 grams (1.5 moles).

The procedure for preparing the amide was as follows:
The ester was heated to 60° C. and ammonia passed into the molten ester slowly through a sparger with an oil bubble trap connected to the top of a reflux condenser so that the loss of ammonia could be kept to a minimum. After 18 grams of ammonia had been added, the reaction mixture was loosely stoppered and stirred overnight at 60° C. Crystals had formed next morning. An additional 7.5 grams of ammonia was slowly added and the mixture held for two hours. Methanol was then added and the solution cooled to 20° C. The nitrilotriacetamide was recovered in 36.8 percent yield.

EXAMPLE 12—Comparative example without agitation

The ester of 2-ethylhexanol and nitrilotriacetic acid was made by combining 955 grams of nitriloacetic acid and 2150 grams of 2-ethylhexyl hexanol using 0.1 percent p-toluene sulfonic acid as a catalyst for the esterification. It required 26 hours to obtain an acid number of 0.4. Thereafter the catalyst was neutralized with potassium carbonate and the ester distilled under vacuum. The ester was combined with ethylene glycol and ammonia in the following proportions:

Triester of 2-ethylhexanol and nitrilotriacetic acid, 26.4 grams (0.05 mole).
Ethylene glycol, 50.0 grams (0.81 mole).
Ammonia, 2.8 grams (0.165 mole).

The procedure used to prepare the amide was as follows: The ester and ethylene glycol were weighed into a flask. Anhydrous ammonia was bubbled into the flask until the foregoing amount had been added. Two layers were formed upon the addition of the ammonia. With agitation, the two layers were homogenized. The mixture was allowed to stand using only intermittent agitation during a two-week period while the temperature of the mixture was maintained at room temperature. After the two-week period, the mixture was examined for crystals of the nitrilotriacetamide. Since none were formed, it is concluded that no reaction took place.

EXAMPLE 13—Comparative example with agitation

A second experiment similar to the above was conducted on a larger scale using a formulation as follows:

Triester of 2-ethylhexanol and of nitrilotriacetic acid, 131.9 grams (0.25 mole).
Ethylene glycol, 100 grams (1.61 mole).
Ammonia, 14 grams (0.82 mole).

For comparative purposes with the formulations of Examples I, III, and IV, the proportions are as follows:

Triester of 2-ethylhexanol and nitrilotriacetic acid, 26.3 grams (0.05 mole).
Ethylene glycol, 20 grams (0.322 mole).
Ammonia, 2.8 grams (0.165 mole).

The procedure was similar to the experiment above except that agitation was continued for 48 hours after mixing the ingredients. The agitation kept the two layers homogenized. After the 48 hour period, no crystals of the nitrilotriacetamide were observed. Analysis of the 2-phase system was attempted to determine unreacted ammonia but because of the 2-phase system, this was difficult to detrmine. The mixture was then allowed to stand at room temperature for about 2 weeks after which time it was noted that crystals of the nitrilotriacetamide had begun to form. After the mixture had been allowed to stand for a total of 3 weeks, the crystals were filtered off and the yield was found to be 30 percent.

EXAMPLE 14—Inventive process with agitation

The triester of ethylene glycol and nitrilotriacetic acid was made by charging 3508 grams ethylene glycol and 1518 grams of nitrilotriacetic acid into a 5 liter flask. A nitrogen sparge was employed and esterification was carried out at 200–250° C. After 5 hours, the esterification was complete as indicated by an acid number of less than one. The temperature was lowered to 25° C.

Nitrilotriacetamide was prepared using the proportion of ingredients which follows.

Triester of ethylene glycol and nitrilotriacetic acid, 16.2 grams (0.05 mole).
Ethylene glycol, 12 grams (0.194 mole). Total ethylene glycol present upon complete conversion of the triester to nitrilotriacetamide is 18.5 grams (0.299 mole).
Ammonia, 2.8 grams (0.165 mole).

The ester and ethylene glycol were charged into a small flask. Ammonia was bubbled in. The flask was stoppered and allowed to stand at room temperature. Within 30 minutes, crystals of nitrilotriacetamide began to form and within 1 hour, the contents of the flask were nearly solid. Titration of the unreacted ammonia indicated that the reaction was 87 percent complete.

EXAMPLE 15—Inventive process without agitation

Using the previously prepared triester of ethylene glycol and nitrilotriacetic acid, nitrilotriacetamide was prepared using the proportion of ingredients which follows.

Triester of ethylene glycol and nitrilotriacetic acid, 16.2 grams (0.05 mole).
Ethylene glycol, 20 grams (0.322 mole).
Ammonia, 2.8 (0.165 mole).

The ester and ethylene glycol were charged into a small flask. Ammonia was bubbled in. The flask was stoppered and allowed to stand at room temperature. Within 40 minutes, crystals of nitrilotriacetamide began to form and within 1 hour, the contents of the flask were nearly solid. Titration of the unreacted ammonia indicated that the reaction was 83 percent complete.

1. A process for producing nitrilotriacetamides which comprises reacting (A) a polyhydroxy ester reaction product of nitrilotriacetic acid and a glycol of two to ten carbon atoms, with (B) a compound selected from the group consisting of ammonia or a primary amine having the formula $NH_2R_2$ wherein $R_2$ is selected from the group consisting of hydrogen, alkyl of 1 to 25 carbon atoms, alkenyl of 2 to 8 carbon atoms, arylalkyl of 7 to 10 carbon atoms, cycloalkyl of 5 to 13 carbon atoms, aminoalkyl of 1 to 4 carbon atoms and hydroxyalkyl of 1 to 3 carbon atoms, wherein said compound has a dissociation constant of less than $1 \times 10^{-7}$.

2. The process of claim 1 wherein the reaction occurs in the presence of a glycol of two to ten carbon atoms.

3. The process of claim 2 wherein said glycol is ethylene glycol.

4. The process of claim 3 wherein said compound (B) is ammonia.

5. The process of claim 3 wherein said compound (B) is monomethylamine.

6. The process of claim 3 wherein said compound (B) is monobenzylamine.

7. The process of claim 3 wherein said compound (B) is monoethanolamine.

8. The process of claim 3 wherein said compound (B) is stearylamine.

9. A process for producing nitrilotriacetamides which comprises reacting nitrilotriacetic acid with a glycol of two to ten carbon atoms to form a polyhydroxy ester, and thereafter reacting the polyhydroxy ester with a compound selected from the group consisting of ammonia or a primary amine having the formula $NH_2R_2$ wherein $R_2$ is selected from the group consisting of hydrogen, alkyl of 1 to 25 carbon atoms, alkenyl of 2 to 8 carbon atoms, arylalkyl of 7 to 10 carbon atoms, cycloalkyl of 5 to 13 carbon atoms, aminoalkyl of 1 to 4 carbon atoms, and hydroxyalkyl of 1 to 3 carbon atoms, wherein said compound has a dissociation constant of less than $1 \times 10^{-7}$.

10. The process of claim 9 wherein reaction of said polyhydroxy ester occurs in the presence of a glycol of two to ten carbon atoms.

11. The process of claim 10 wherein said glycol is ethylene glycol.

12. The process of claim 11 wherein said compound is ammonia.

13. The process of claim 11 wherein said compound is monoethylamine.

14. The process of claim 11 wherein said compound is monobenzylamine.

15. The process of claim 11 wherein said compound is monoethanolamine.

16. The process of claim 11 wherein said compound is stearylamine.

17. A process for producing a nitrilotriacetamides which comprises reacting a polyhydroxy ester reaction product of nitrilotriacetic acid and ethylene glycol with dimethylamine.

18. A process for producing nitroilotriacetamides which comprises reacting nitrilotriacetic acid with ethylene glycol to form a polyhydroxy ester and thereafter reacting said polyhydroxy ester with dimethylamine.

19. A process for producing nitrilotriacetamides which comprises reacting a polyhydroxy ester reaction product of nitrilotriacetic acid and ethylene glycol with ethylene diamine.

20. A process for producing nitriolotriacetamides which comprises reacting nitrilotriacetic acid with ethylene glycol to form a polyhydroxy ester and thereafter reacting said polyhydroxy ester with ethylene diamine.

References Cited
UNITED STATES PATENTS

| | | | |
|---|---|---|---|
| 2,580,832 | 1/1952 | Pietrusza | 260—561 A |
| 2,921,085 | 1/1960 | Schramm | 260—561 AX |
| 3,515,747 | 6/1970 | Marans | 260—561 AX |

OTHER REFERENCES

Gordon et al., J.A.C.S., vol. 71, 1949, pp. 1245–50.

LEWIS GOTTS, Primary Examiner

E. G. LOVE, Assistant Examiner

U.S. Cl. X.R.

260—482 R, 562 N